(12) United States Patent
Barkan et al.

(10) Patent No.: US 10,963,781 B2
(45) Date of Patent: Mar. 30, 2021

(54) CLASSIFICATION OF AUDIO SEGMENTS USING A CLASSIFICATION NETWORK

(71) Applicant: Microsoft Technology Licensing, LLC, Redmond, WA (US)

(72) Inventors: Oren Barkan, Tel Aviv (IL); Noam Koenigstein, Tel Aviv (IL); Nir Nice, Salit (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 841 days.

(21) Appl. No.: 15/676,075

(22) Filed: Aug. 14, 2017

(65) Prior Publication Data

US 2019/0050716 A1 Feb. 14, 2019

(51) Int. Cl.
| | |
|---|---|
| *G06N 3/04* | (2006.01) |
| *G06N 3/08* | (2006.01) |
| *G06F 16/638* | (2019.01) |
| *G06F 16/68* | (2019.01) |
| *G06F 16/00* | (2019.01) |
| *G10L 25/48* | (2013.01) |
| *G10L 25/30* | (2013.01) |

(52) U.S. Cl.
CPC .......... *G06N 3/0472* (2013.01); *G06F 16/00* (2019.01); *G06F 16/639* (2019.01); *G06F 16/686* (2019.01); *G06N 3/0454* (2013.01); *G06N 3/08* (2013.01); *G10L 25/30* (2013.01); *G10L 25/48* (2013.01)

(58) Field of Classification Search
CPC ...... G06N 3/0472; G06N 3/0454; G06N 3/08; G06F 16/686; G06F 16/00; G06F 16/639; G06F 16/68; G10L 25/48; G10L 25/30
See application file for complete search history.

(56) References Cited

U.S. PATENT DOCUMENTS

2004/0260550 A1 * 12/2004 Burges .................... G10L 17/00
704/259
2007/0174274 A1 * 7/2007 Kim ...................... G06F 16/634
(Continued)

OTHER PUBLICATIONS

Lidy et al, Parallel Convolutional Neural Networks for Music Genre and Mood Classification, Feb. 23, 2017, researchgate.net (Year: 2017).*

(Continued)

*Primary Examiner* — Shane D Woolwine
(74) *Attorney, Agent, or Firm* — Fountainhead Law Group P.C.

(57) ABSTRACT

In one embodiment, an audio signal for an audio track is received and segmented into a plurality of segments of the audio signal. The plurality of segments of audio are input into a classification network that is configured to predict output values based on a plurality of genre and mood combinations formed from different combinations of a plurality of genres and a plurality of moods. The classification network predicts a set of output values for the plurality of segments, each of the set of output values corresponding to one or more the plurality of genre and mood combinations. One or more of the plurality of genre and mood combinations are assigned to the audio track based on the set of output values for one or more of the plurality of segments.

19 Claims, 9 Drawing Sheets

(56) References Cited

U.S. PATENT DOCUMENTS

| | | | | |
|---|---|---|---|---|
| 2011/0289075 | A1* | 11/2011 | Nelson | G06F 16/639 |
| | | | | 707/723 |
| 2015/0058367 | A1* | 2/2015 | Brull | G06F 16/335 |
| | | | | 707/754 |
| 2016/0098602 | A1* | 4/2016 | Guegan | G06K 9/00718 |
| | | | | 725/9 |
| 2016/0357863 | A1* | 12/2016 | Albalat | G06F 16/686 |

OTHER PUBLICATIONS

Hershey et al, CNN Architectures for Large-Scale Audio Classification, Jan. 10, 2017, arxiv (Year: 2017).*
Costa et al, Music genre classification using LBP textural features, 2012, Signal Processing 92 (2012) 2723-2737 (Year: 2012).*
Choi et al, Explaining Deep Convolutional Neural Networks on Music Classification, Jul. 8, 2016, arxiv (Year: 2016).*
U.S. Appl. No. 15/169,305, filed May 31, 2016 by Noam Koenigstein et al.; 42 pages.

* cited by examiner

CLASSIFICATION OF AUDIO SEGMENTS USING A CLASSIFICATION NETWORK

BACKGROUND

A streaming music service allows users to stream music from the service's music catalog. Typically, the music catalog is very large, which makes music discovery an important aspect of the service. To help with discovery, the service may categorize audio tracks into genres, such as rock, dance, pop, and electronic. Typically, this is a manual process to label each audio track with a genre. This is inefficient and time-consuming and also may depend upon the subjective opinions of the users labeling the audio tracks.

DETAILED DESCRIPTION

A system can classify audio, such as audio tracks, with genre and mood combinations. The genre may be the type of music, such as jazz, rock, electronic, etc. The mood may be the feeling or state of mind invoked by the audio, such as calm, mid-tempo, and upbeat. For example, a genre and mood combination label may include rock calm, rock mid-tempo, and rock upbeat. A classification network allows the audio to be classified with the genre and mood labels without human intervention, which provides more normalized labeling of the audio and avoids mislabeling of audio tracks.

The classification network that can identify the mood in combination with the genre. That is, if the genre is not specified, it is technically hard to identify the mood. For example, if rock songs are being classified for mood, the mood may always be upbeat because the rock songs may always be upbeat compared to a classical music track. However, within the genre of rock, some parts of the audio may be considered calm and some parts may be upbeat.

The classification network may predict output values for genre and mood combinations for the segments of audio of an audio track. For example, the output values may be scores or probabilities that the segment of audio includes audio that falls within each genre and mood combination. Once the classification network predicts the output values for the segments of the audio for the genre and mood combinations, the system may perform different services. For example, the system may automatically label the audio track with a genre and mood combination that has the highest average output value over all the segments. Additionally, an audio track may be labeled with multiple genre and mood combinations, such as a top X number of genre and mood combination labels with the highest average output value. Then, one of the genre and mood combinations can be selected, and at least one segment that has an output value above a threshold for that genre and mood combination is automatically played for a user. For example, playback of the audio track may start at a segment that has the highest output value associated with the selected genre and mood combination label. The system may also offer other services, such as measuring similarity between audio tracks using the genre and mood combinations, detecting and correcting misclassified audio tracks, and generating playlists according to genre and mood combinations.

Figure 1:
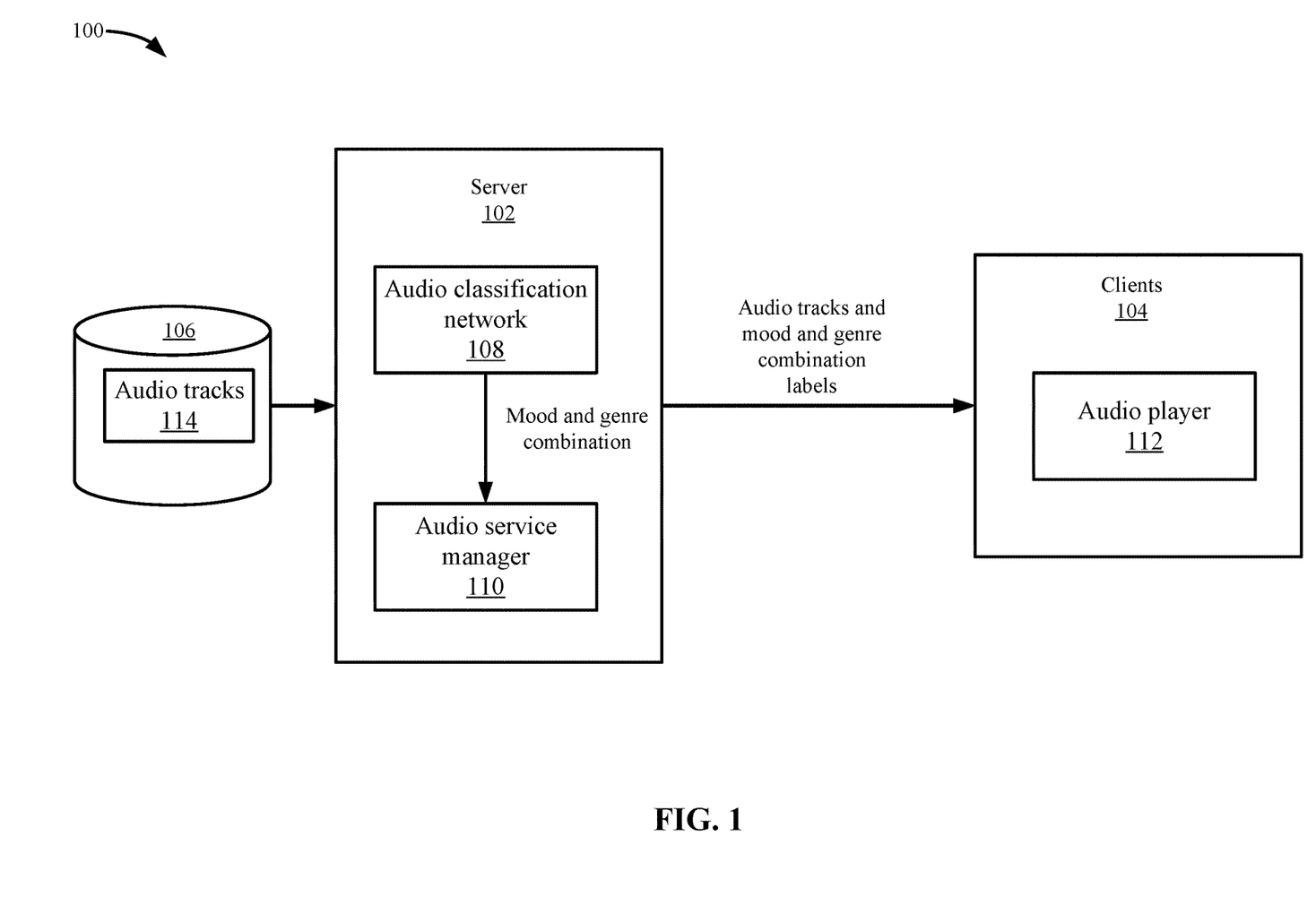
FIG. 1 depicts a simplified system for classifying audio tracks with genre and mood combinations according to some embodiments.

FIG. 1 depicts a simplified system 100 for classifying audio tracks 114 with genre and mood combinations according to some embodiments. System 100 includes a server 102, clients 104, and storage 106. Server 102 may perform the classification of audio tracks 114 stored in storage 106. Additionally, clients 104 may request audio tracks 114 from server 102 that have been classified. Although a single server 102 is shown, it will be understood that functions of server 102 may be distributed across multiple computing devices.

Audio may be stored in instances of audio, such as audio tracks. For example, an audio track 114 may be a song that is stored in a file. Although songs may be discussed, other audio may be used, such as audio tracks 114 for movies, television, or other media. Storage 106 may store multiple audio tracks 114 that may include raw audio, which is uncompressed audio.

Server 102 includes an audio classification network 108 and an audio service manager 110. Audio classification network 108 is configured to classify audio tracks 114 with genre and mood combinations. An audio signal for an audio track may be received at server 102 for analysis by audio classification network 108. Then, audio classification network 108 may generate output values that score segments of the audio based on the genre and mood combinations. For example, the output values may be related to a probability that the segment includes characteristics related to a genre and mood combination. Based on the output values, audio classification network 108 may label the audio track 114 with one or more genre and mood combination labels. For example, a track may be labeled with a rock uptempo genre and mood combination label, a rock midtempo genre and mood combination label, and a jazz uptempo genre and mood combination label. Or, the audio track 114 may just be labeled with a single genre and mood combination label of rock uptempo (e.g., the label with the highest average output score overall for all segments). In other embodiments, all genre and mood combinations may be listed for audio track 114, although for a song, some genre and mood combinations may have output values at zero or close to zero. This is because a song typically does not include audio that has characteristics of all possible genre and mood combinations.

Once the audio tracks 114 are labeled with genre and mood combinations, audio service manager 110 may provide services based on the output values for the genre and mood combinations. As will be discussed in more detail below, audio service manager 110 may allow users to select a genre and mood combination label for an audio track 114 and then automatically start play back of audio track 114 using a segment that is associated with the genre and mood combination label. Also, audio service manager 110 may provide multiple genre and mood combination labels for an audio track 114 and allow the user to select different genre and mood combination labels and play different segments of the audio track 114 corresponding to the respective labels. Other services include assigning the audio track 114 with the genre and mood combination label that has the highest overall output score or assigning the top X genre and mood combinations. Another service uses the genre and mood combination labels to measure the similarity between audio tracks 114. Also, mislabeled audio tracks 114 that were previously tagged can be identified as incorrect and corrected, such as audio tracks 114 that were previously tagged using manual labeling. Audio service manager 110 may further generate playlists using the genre and mood combination labels as seeds. For example, a list of audio tracks 114 that are associated with a genre and mood combination of rock upbeat may be generated as a playlist.

Clients 104 may be computing devices used by users that can access some of the above services. For example, clients 104 include an audio player 112 that can display a user interface that displays audio tracks 114 and associated genre and mood combination labels for those audio tracks 114. Users can then select a genre and mood combination label and start playback at a segment corresponding to that label. Also, users may access playlists generated by the genre and mood combination labels.

Classification Network

Figure 2:
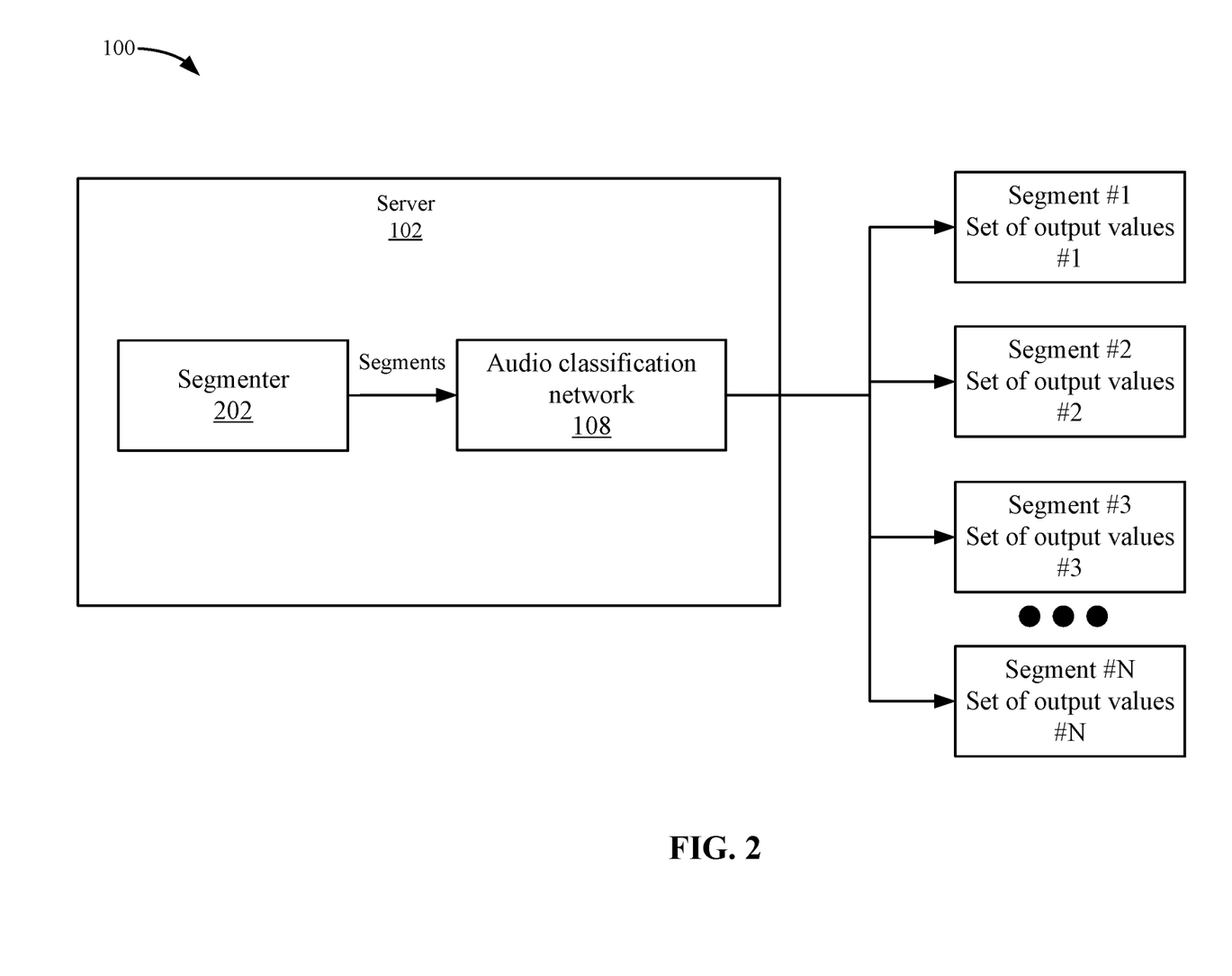
FIG. 2 depicts a more detailed example of an audio classification network according to some embodiments.

A specialized classification network is used to select genre and mood combination labels for audio tracks 114. FIG. 2 depicts a more detailed example of audio classification network 108 according to some embodiments. A segmenter 202 receives an audio track 114 (e.g., an audio signal) and can segment the audio track 114 into segments of audio. For example, segmenter 202 may segment the audio into uniform segments, such as one second segments, five second segments, twenty second segments, etc. Segments of audio track 114 are used such that portions of audio track 114 can be classified with different genre and mood combinations. In other embodiments, the entire audio track may be used without segmenting.

The segments are then input into audio classification network 108. In some embodiments, audio classification network 108 includes a prediction network, such as a neural network, that is trained to predict output values for genre and mood combinations. As discussed above, the prediction network may not predict output values for genre and output values for mood separately. To perform the predication for genre and mood combinations, audio classification network 108 may be trained on a labeled dataset of pairs in the form of [audio track segments, label], where the labels are a combination of genre and mood as discussed above. The supervised training may input audio segments into audio classification network 108 to train the network to predict output values for the labeled genre and mood combinations. This trains the neural network to predict output values for the genre and mood combinations that are available in a supervised manner. Although this method of training is described, other methods of training may be used, such as unsupervised training.

Upon training, audio classification network 108 can receive each segment from segmenter 202 and predict output values for genre and mood combination labels for each segment. The output value for a genre and mood combination may indicate how confident audio classification network 108 considers that the characteristics of the segment fall within the genre and mood combination. For example, a higher output value for a genre and mood combination indicates that audio classification network 108 is more confident that the segment is associated with the label compared to a lower output value.

In some embodiments, audio classification network 108 predicts output values for all possible genre and mood combinations for each segment. As shown, segments #1 through #N include a set of output values #1 for genre and mood combinations to a first set of output values #N, respectively, where N is the number of segments in audio track 114.

Figure 3A:
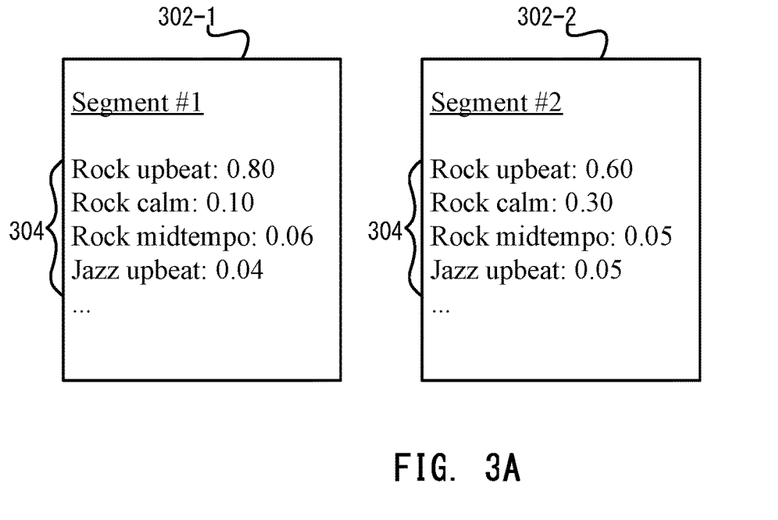
FIG. 3A shows an example of the output values for the segments according to some embodiments.

In some examples, the number of possible genre and mood combinations depends on the number of genres and the number of moods. If, for example, there are 11 genres and 3 moods, then the number of possible genre and mood combinations is 33, although not all 33 genre and mood combinations need to be used. FIG. 3A shows an example for the output values of the segments according to some embodiments. At 302-1 and 302-2, two segments are shown, but audio track 114 may include other segments that are not shown. At 304, corresponding output values for genre and mood combinations are shown for each segment. In this example, only the genre and mood combination labels of rock upbeat, rock calm, rock midtempo, and jazz calm are shown. Only a small amount of labels are shown for each segment for illustrative purposes, but classification network 108 predicts output values for all possible genre and mood combinations in some embodiments.

At 304, the output values for the genre and mood combinations may vary over segments when the audio characteristics change. For segment #1, the highest output value is the genre and mood combination of rock upbeat at 0.80. Segment #1 has includes lower output values for the genre and mood combination of rock calm (0.10); the genre and mood combination label of rock mid-tempo (0.06); and the genre and mood combination label of jazz calm (0.04). There may be other output values for other genre and mood combinations, but these output values may be zero or statistically insignificant. The output values [0.60, 0.30, 0.05, 0.05] for the same genre and mood combinations for segment #2 are different, but it is also possible that segment #2 includes different genre and mood combinations that have output values that are nonzero.

Once audio classification network 108 has predicted output values for all segments of audio track 114, audio service manager 110 may use the output values to provide different services. The output values for all genre and mood combinations may be predicted for all segments. In some examples, audio service manager 110 may take the average of output scores for all segments. That is, for the rock uptempo label, the output values for the rock uptempo combination for segments #1 through #N is calculated. The average output scores may then be used to assign the audio track 114 with the genre and mood combination labels with the highest output values. For example, the audio track 114 may be assigned the rock uptempo label if that label includes the highest average output value for all segments. The highest average output value does not have to be used to determine the genre and mood combination label for the audio track. For example, the highest output value for a genre and mood combination for one segment may be used to assign the genre and mood combination label for the audio track.

Audio service manager 110 may also assign multiple genre and mood combination labels to audio track 114. For example, audio service manager 110 selects the genre and mood combinations with average output values that are above a threshold. Or, audio service manager 110 may select N genre and mood combinations with the highest average output scores. Audio service manager 110 may then offer a service that allows a user to select one of the labels and have playback start at a segment associated with the label. For instance, each genre and mood combination label is associated with a segment with the highest output value for that genre and mood combination label. This would allow a user to select a genre and mood combination label and start playback of the audio track 114 at a segment corresponding to that label, such as the segment with the highest output value for that label may be selected for playback. However, the segment with the highest output value does not need to be used. For example, playback of all segments with output scores above a threshold for the genre and mood combination may be used.

Figure 3B:
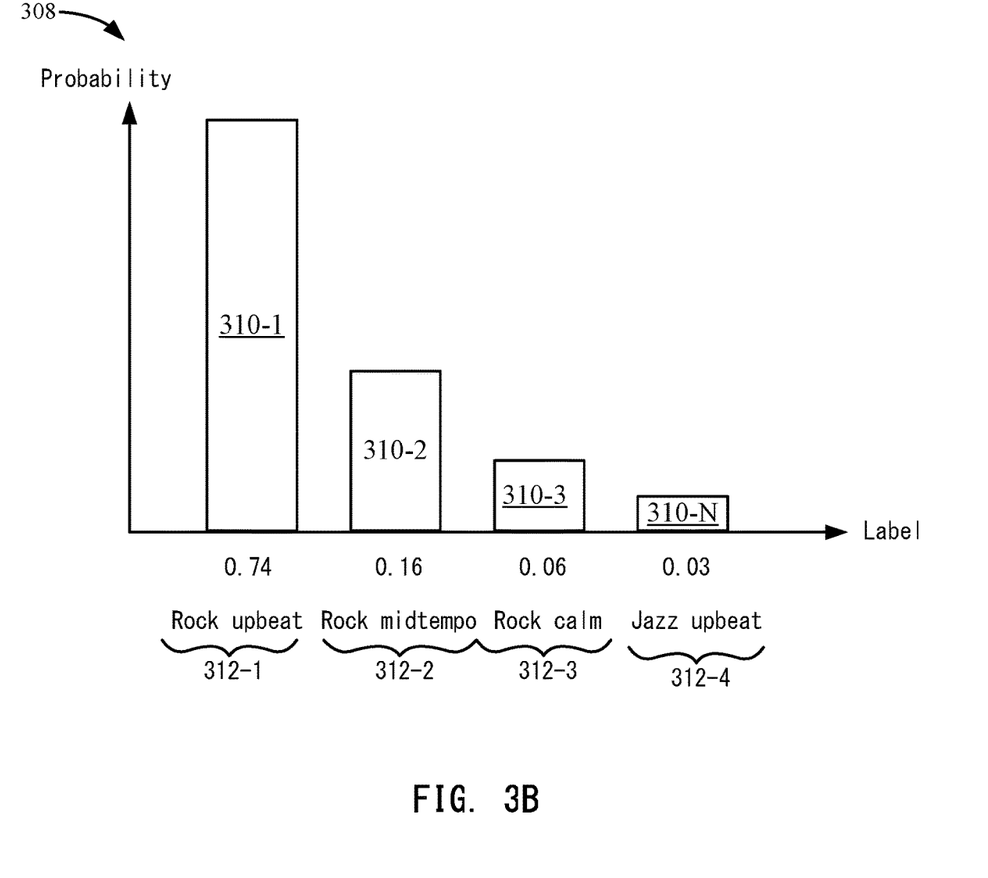
FIG. 3B depicts a visual representation of output values for the genre and mood combination labels according to some embodiments.

Audio service manager 110 may also generate a representation of genre and mood combination labels for the audio track. FIG. 3B depicts a visual representation of the genre and mood combination labels according to some embodiments. Audio service manager 110 receives the segments with the respective output values and can generate a representation based on the overall output values for the segments for the audio track. In some embodiments, audio service manager 110 can generate a visual representation, such as a histogram 308, but other representations may be appreciated, such as pie charts, lists, etc.

In some embodiments, audio service manager 110 may calculate the overall average output values for the genre and mood combination labels over all the segments of the audio track. Also, instead of the average, audio service manager 110 may use the highest output value for each genre and mood combination label, a maximum, median, or use other methods of summarizing the output values. In histogram 308, output values for some genre and mood combination labels are shown. The genre and mood combination labels may be selected in different ways. For example, the genre and mood combinations that that have the highest average output values above a threshold are selected. Or the genre and mood combinations with the top N average output values are selected. Other genre and mood combination labels not shown may have statistically negligible output values or a value of zero. At 312-1, a bar 310-1 shows the average output value of the rock upbeat combination label as 0.74. The range of output values may be within the range of 0-1 in this case, with an output value closer to the value of one indicating a higher confidence that the segment corresponds to that label. At 312-2, a bar 310-2 for the rock calm combination label is shown with an average output value of 0.16. At 312-3, a bar 310-3 for the rock mid-tempo combination label is shown with the output value of 0.06. At 312-N, a bar 310-N for the jazz calm combination label is shown with the average probability of 0.03.

Histogram 308 may be used to describe the genre and mood of an audio track 114. For example, a user can view which genre and mood combination labels have the highest output values among the labels. The higher the average output means the characteristics of audio are more likely to include the genre and mood combination.

Also, a user can select one of the genre and mood combination labels and start playback of the audio track 114 at a segment that has been associated with that label. For example, audio service manager 110 may select a segment with the highest output value for the selected genre and mood combination label and start playback of the audio track 114 at that segment. In other embodiments, audio service manager 110 may play segments that have an output value for that genre and mood combination label that is above a threshold. For example, all segments that have an output value of over 0.80 for the genre and mood combination label are played.

Figure 4A:
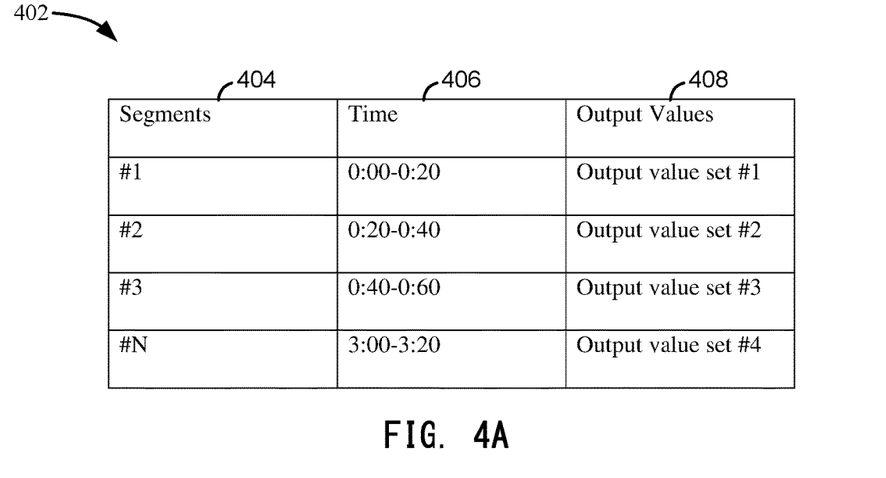
FIG. 4A depicts an example of information stored to allow for playback of segments corresponding to genre and mood combination labels according to some embodiments.

To provide a service using the above representation, audio service manager 110 may store information for the visual representation in storage 106. FIG. 4A depicts an example of information stored to allow for playback of segments corresponding to genre and mood combinations according to some embodiments. A database table 402 may store the segments and output values for genre and mood combination labels. For example, a column 404 may identify the segments, and a column 406 identifies a time for the segment in the audio track. The time may be a start and end time, a start time, a segment number, or other identification of the time within the audio track. A column 408 then lists the output values for the genre and mood combinations.

Audio service manager 110 can then generate histogram 308 using the information in table 402. The output value for each specific genre and mood combination bar 310 may be the average output value over all the segments. Audio service manager 110 may store the histogram representation in a table 412 in FIG. 4B. Table 412 includes a first column 414 that lists the genre and mood combination labels, a second column 416 that lists the average output value for the genre and mood combination labels, and a column 418 that links to a time or a segment in the audio track. The segment or time in the audio track 114 may point to the segment that has the highest output value for the genre and mood combination label. For example, if the genre and mood combination label has an average probability of 0.74, there may be segments that have a higher probability, such as 0.99. In some embodiments, audio service manager 110 may insert a link to the segment with the highest probability for the specific genre and mood combination label. In other examples, links to the time for multiple segments that have output values over a threshold for the specific genre and mood combination label may be inserted in column 418.

Figure 4B:
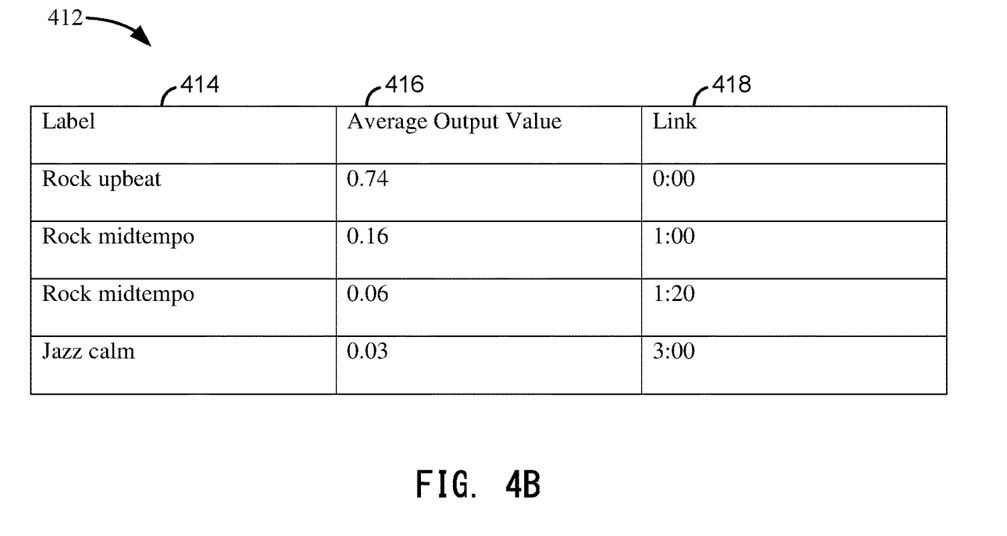
FIG. 4B depicts an example of information stored for the histogram representation in a table according to some embodiments.

Table 412 may be used when a user selects one of the genre and mood combination labels for an audio track 114. For example, if a user wants to listen to a segment for the rock upbeat combination label in audio track 114, then audio service manager 110 looks up the rock upbeat combination label in table 412 and selects the segment link (e.g., time) in column 418. In some examples, the segment link may start to play the segment that has the highest output value for the rock upbeat label. In another example, audio service manager 110 may play all of the segments that have output values above a threshold for the rock upbeat label consecutively. In other embodiments, a minimum amount of the audio track 114 is played to allow the user to comprehend what is being played, such as 40 or more seconds. This will avoid very short segments that may not be recognizable to a user, but may include audio that may have output values that are higher for other genre and mood combinations. That is, the audio may transition to a segment that has a higher output value for the rock midtempo label than the rock upbeat label at some point during playback.

Audio Classification Network 108

Figure 5:
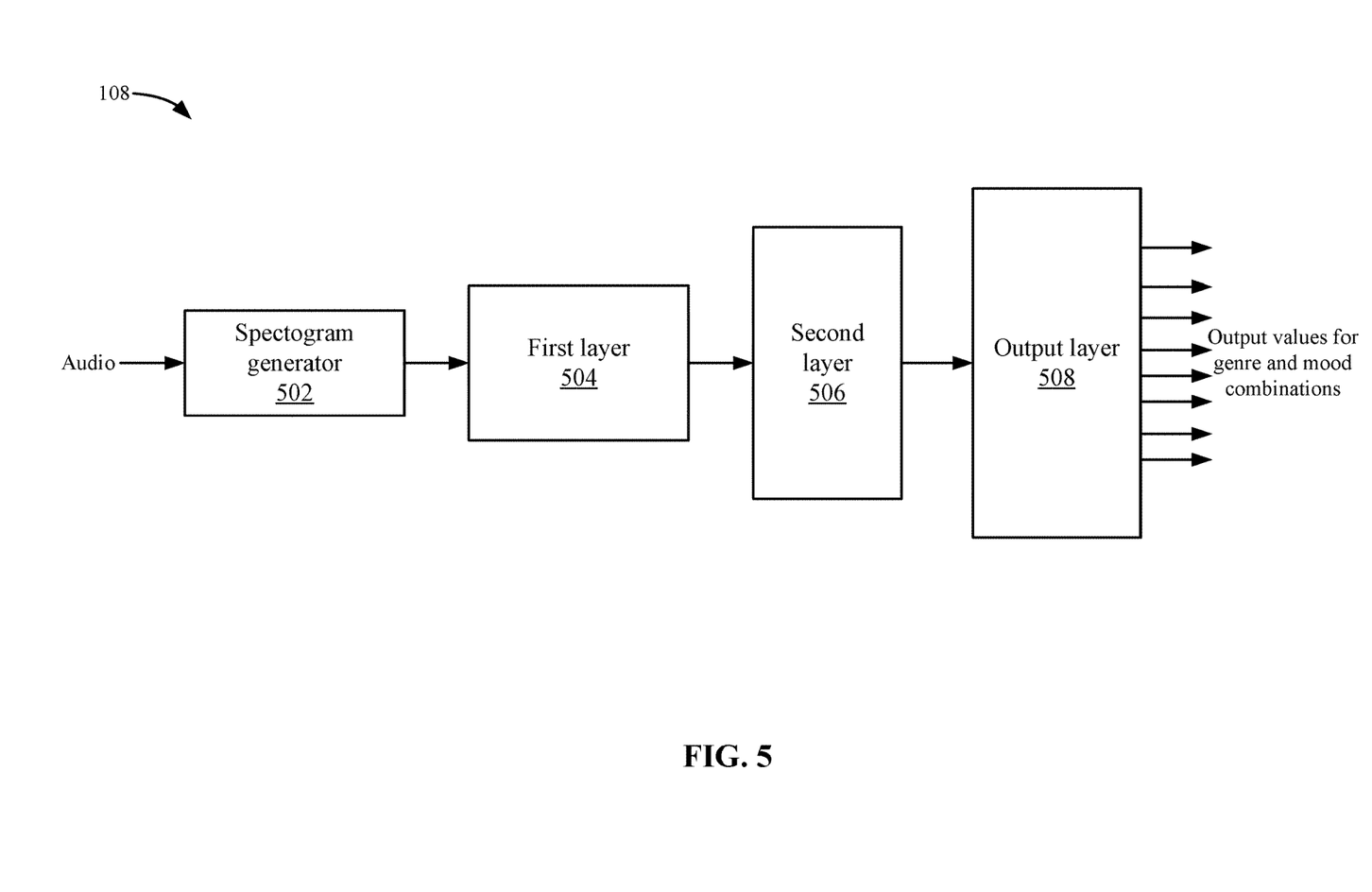
FIG. 5 depicts an example of audio classification network according to some embodiments.

FIG. 5 depicts an example of audio classification network 108 according to some embodiments. Audio classification network 108 includes a spectogram generator 502, a first 504, a second layer 506, and an output layer 508. Although this example is described, it will be understood that variations of the classification network may be appreciated.

Spectogram generator 502 receives an audio signal, such as raw audio, from an audio track. Then, spectogram generator 502 transforms the raw audio into a representation, such as a spectogram matrix or melspectogram. For example, each segment may be transformed into a spectogram matrix. The spectogram may be a representation of a spectrum of frequencies of sound that vary over time, such as an acoustic time-frequency representation of audio. One axis of the spectogram may be frequency and the other axis may be time, such as the horizontal axis may be time and the vertical axis may be frequency. A third dimension may indicate the amplitude of the particular frequency at a particular time and represented by the intensity or color in each point in the spectogram. In some embodiments, each audio track is downsampled to a frequency, such as 22 Khz. Then, a melspectogram is computed with fast Fourier transform (FFT) window size of 2048, half overlapping frames, and 128 mel filter banks. This process produces a matrix in size of 128×430.

The spectogram may then be input into a first layer referred to as a convolution layer and max pooling layer 504. Convolution layers and max pooling layers may alternate within convolution layer and max pooling layer 504. For example, a first convolution layer filters the spectogram based on a set of N filters with a specific size M. The convolution operator of the convolution layer may be one dimensional or two dimensional. Each filter is convolved across the width and height of the spectogram and a neuron computes dot products between the entries of the filter and the input at any position. As the filter is moved over the width and height of the spectogram, convolution layer produces a 1-dimensionals or 2-dimensional activation map that gives the responses of that filter at every spatial position. Then, a max pooling (MP) layer takes a maximum between every pair of neurons from the convolution layer to form a new compressed representation. The max pooling operator may also be one dimensional or two dimensional. Max pooling can be applied over an entire axis, such as the max pooling function takes the maximum of values across a specific axis and is referred to as global max pooling. The max pooling may combine the outputs of neuron clusters from the convolution layer into a single neuron in the next convolution layer. For example, max pooling uses the max value of each of the cluster of neurons of the prior layer. The convolution and max pooling layers learn filters that activate when the filters detect some specific type of feature at some spatial position in the input.

Then, a second convolution layer may be applied to the output of the first max pooling layer. After the second convolution layer performs its filtering, a second max pooling layer may be applied. In some embodiments, 5 convolution layers and 5 max pooling layers may be used, but other configurations may be appreciated.

The output of the convolution layer and max pooling layer 504 is a feature map that can be input into fully-connected hidden layer 506. The feature map output from convolution layer and max pooling layer 504 has extracted the useful features of the audio spectograms. In some embodiments, the output of convolution layer and max pooling layer 504 is a vector that eliminates the time axis. A second layer may be referred to as a fully-connected hidden layer 506 can then predict the output values of the genre and mood combination labels.

The fully-connected hidden layer 506 may contain P neurons where each neuron is connected to all neurons in the previous layer. Fully-connected hidden layer 506 may apply an operator, such as a soft-max operator, to convert the outputs from the previous layer to scores in a range, such as a range from 0 to 1 [0,1] where all scores are summed to 1. The fully-connected hidden layer may be able to learn non-linear combinations of the features and the sum of output possibilities from the fully-connected hidden layer is 1. Fully-connected hidden layer 506 may predict the output values of the genre and mood combinations in output layer 508. Accordingly, fully-connected hidden layer 506 has been configured to predict the genre and mood combinations rather than a genre separately and a mood separately. For fully-connected hidden layer 506 to predict the genre and mood combinations, fully-connected hidden layer 506 is trained on genre and mood combination labels. Output layer 508 can then predict output values for all of the genre and mood combinations for an audio segment. For example, for a segment, output layer 508 may predict output values at nodes that correspond to respective genre and mood combinations.

Figure 6:
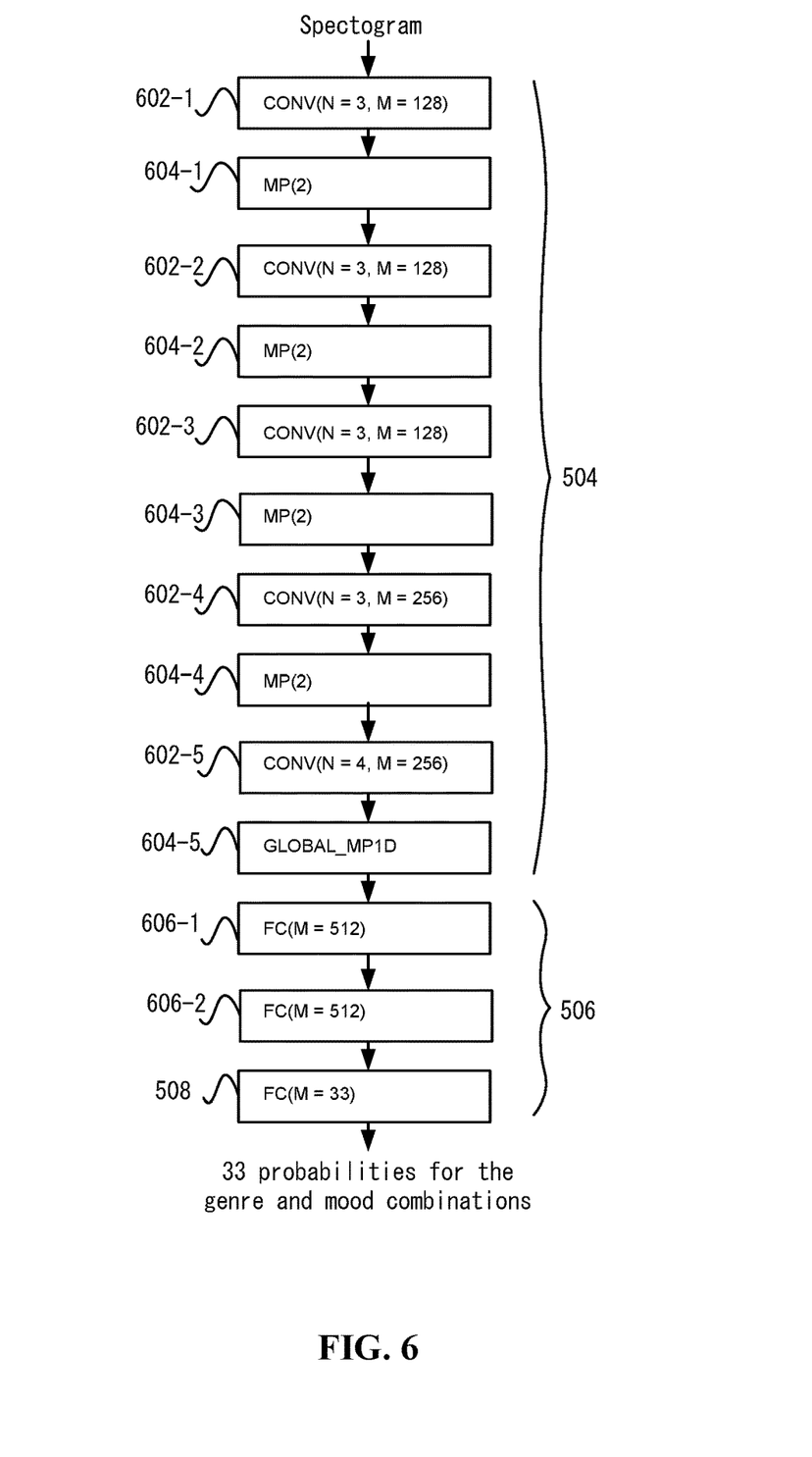
FIG. 6 shows a more detailed example of an architecture of the audio classification network according to some embodiments.

FIG. 6 shows a more detailed example of an architecture of audio classification network 108 according to some embodiments. A first convolution layer (CONV(N=3, M=128)) 602-1 receives the spectogram. This convolution layer may have N=3 filters with a specific size of M=128. A size of M=128 may filter 128 units of the spectogram to form a new compressed representation. The output of the convolution layer at 602-1 is input into a max pooling layer (MP(2)) at 604-1. This max pooling layer may take the maximum between every pair of neuron outputs from the convolution layer at 602-1 to form a new compressed representation.

A second convolution layer (CONV(N=3, M=128)) at 602-2 may have N=3 filters of an M=128 size. The output of the second convolution layer 602-2 is input into a second max pooling layer (MP(2)) 604-2. The max pooling layer takes the maximum between every pair of neuron outputs from the second convolution layer to form a new compressed representation.

A third convolution layer (CONV(N=3, M=128)) 602-3 is of the size (N=3, M=128). The output of third convolution layer 602-3 is input into a third max pooling layer (MP(2)) 604-3 that again takes the maximum between every pair of neuron outputs.

A fourth convolution layer (CONV(N=3, M=256)) 602-4 is of the size (N=3, M=256). This increases the size of the filter to 256 units. The output of fourth convolution layer 602-4 is input into a fourth max pooling layer (MP(2)) 604-4, which again takes the maximum between every pair of neuron outputs to form a new compressed representation. Then, a fifth convolution layer (CONV(N=3, M=256)) 602-5 of the size (N=4, M=256) is applied to the output of the fourth max pooling layer 604-4. Then, a global max pooling layer (GLOBAL_MP1D) 604-5 takes the maximum over time and outputs a vector. Global max pooling layer 604-5 eliminates the time axis.

Fully-connected hidden layer 506 receives the vector and includes three fully-connected layers with the last fully connected layer being output layer 508. In some embodiments, a first fully-connected layer (FC(M=512) 606-1 is of the size (M=512) which contains 512 neurons where each neuron is connected to the previous layer. Each neuron may have an activation function that maps the weighted inputs to the output of each neuron. A soft max operator in between the fully-connected layers may convert the outputs from the previous layer to scores in the [0, 1] range where all scores are summed to 1. A second fully-connected layer (FC (M=512) 606-2 is also of the size (M=512). Then, a third fully-connected layer (FC(M=33) is of the size (M=33), which is output layer 508. The size (M=33) corresponds to the 33 possible genre and mood combinations. The third fully connected layer may predict 33 output values for the 33 possible genre and mood combinations. If a different number of genre and mood combinations are possible, then the number of neurons in output layer 508 is changed to equal the new number of possible genre and mood combinations.

A technical advantage of training fully-connected hidden layer 506 to predict output values for each of the genre and mood combination layers is that audio classification network 108 can identify the moods within the genres more accurately. Configuring the output layer of fully-connected hidden layer 506 to identify the 33 possible genre and mood combinations allows audio classification network 108 to detect the moods within the genres more accurately because the moods may sound different in different genres. Also, once trained, faster label calculation is provided than having a user listen to the audio and submit a label.

Services

Audio service manager 110 may perform different services with the output of output layer 508. The example in FIGS. 3 and 4 describes the use of the histogram to tag the audio track 114 with different genre and mood classification labels to allow a user to select one of the labels and play portions of the audio track 114 that correspond to the genre and mood combination labels. Another service may be to measure the similarity between audio tracks 114. In some examples, audio service manager 110 may look at the output values of the genre and mood combination labels and compare audio tracks 114. For example, a first audio track 114 may be similar to another audio track 114 if these two audio tracks 114 have similar histogram distributions of genre and mood combinations. All of the genre and mood combinations may be used or just a subset. For example, if only the highest probability genre and mood combination label is used, if the first audio track 114 includes a rock upbeat label with a 75% probability and the second audio track 114 includes a rock upbeat label with a 76% probability, audio service manager 110 may determine that these two audio tracks 114 are similar. Also, audio service manager 110 may also include N number of genre and mood combination labels in the comparison, such as the highest 4 genre and mood combination labels may be compared for each audio track 114 to determine similarity. This comparison may compare just genre and mood combination labels or also compare the output values of genre and mood combination labels. For example, the comparison may look for audio tracks that both include the rock upbeat and jazz calm labels. Or, the comparison may look for audio tracks that have the rock upbeat label with an output value around X and the jazz calm label with the output value around Y. Using the comparison, users may be able to find rock upbeat audio tracks 114 that have some jazz calm portions in the audio track.

Another method for determining the similarity may be to determine the similarity not at the output layer 508 that includes the 33 classifications but rather at one of the hidden layers in fully-connected hidden layer 506. The comparison between audio tracks 114 may compare vectors that are output by one of the hidden layers. This may provide a representation of the audio track 114 that may provide a more complete comparison because the output of the hidden layer may not be restricted to the 33 genre and mood combinations, but rather uses values for 512 neurons (or another number depending on the structure of the hidden layers). The comparison may be between vectors from one of the hidden layers in which a similarity, such as a cosine similarity, between the layers for different audio tracks 114 may be used.

In another service, audio service manager 110 may generate a playlist according to the genre and mood combination labels. For example, audio service manager 110 may determine playlists that include a high probability of rock upbeat portions. Also, the playlist may be more specific if more genre and mood labels are considered, such as a playlist including audio tracks that include rock upbeat portions with some jazz calm portions may be generated.

Audio service manager 110 may also detect and correct mislabeled audio tracks 114. For example, some audio tracks 114 in the service may have been labeled manually. Audio service manager 110 may review the labels for all audio tracks 114 and change any labels for audio tracks 114 that have been mislabeled. For example, the manual labeling may not have been able to distinguish between and audio track 114 that may have had a jazz portion but is a pop song. Audio service manager 110 may then change this label.

Method Flows

Figure 7:
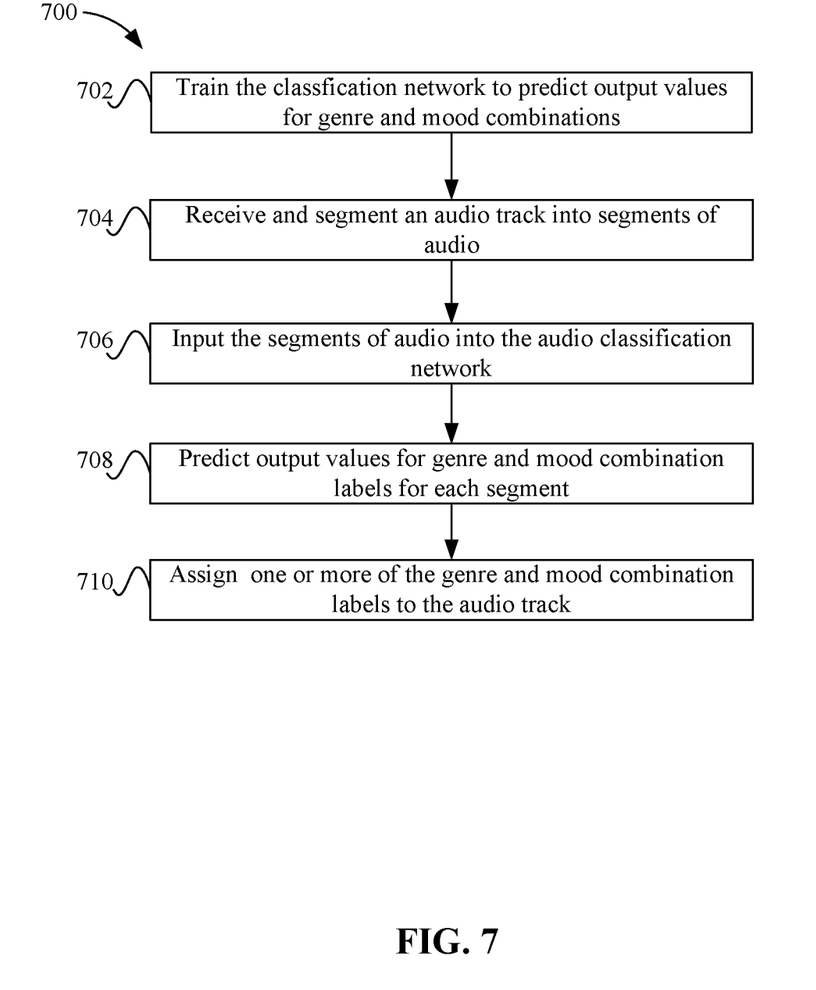
FIG. 7 depicts a simplified flowchart of a method for classifying audio tracks according to some embodiments.

FIG. 7 depicts a simplified flowchart 700 of a method for classifying audio tracks 114 according to some embodiments. At 702, audio classification network 108 is trained to predict output values for genre and mood combinations. For example, audio classification network 108 is trained on a labeled data set of pairs in the form of audio track and label, where the labels are a combination of genre and mood.

At 704, an audio track 114 is received and segmented into segments of audio. At 706, the segments of audio are input into the audio classification network 108. At 708, audio classification network 108 then predicts output values for genre and mood combination labels for each segment. At 710, the audio track 114 may be assigned one or more of the genre and mood combination labels. For example, N genre and mood classification labels with the average probabilities above a threshold may be used.

Figure 8:
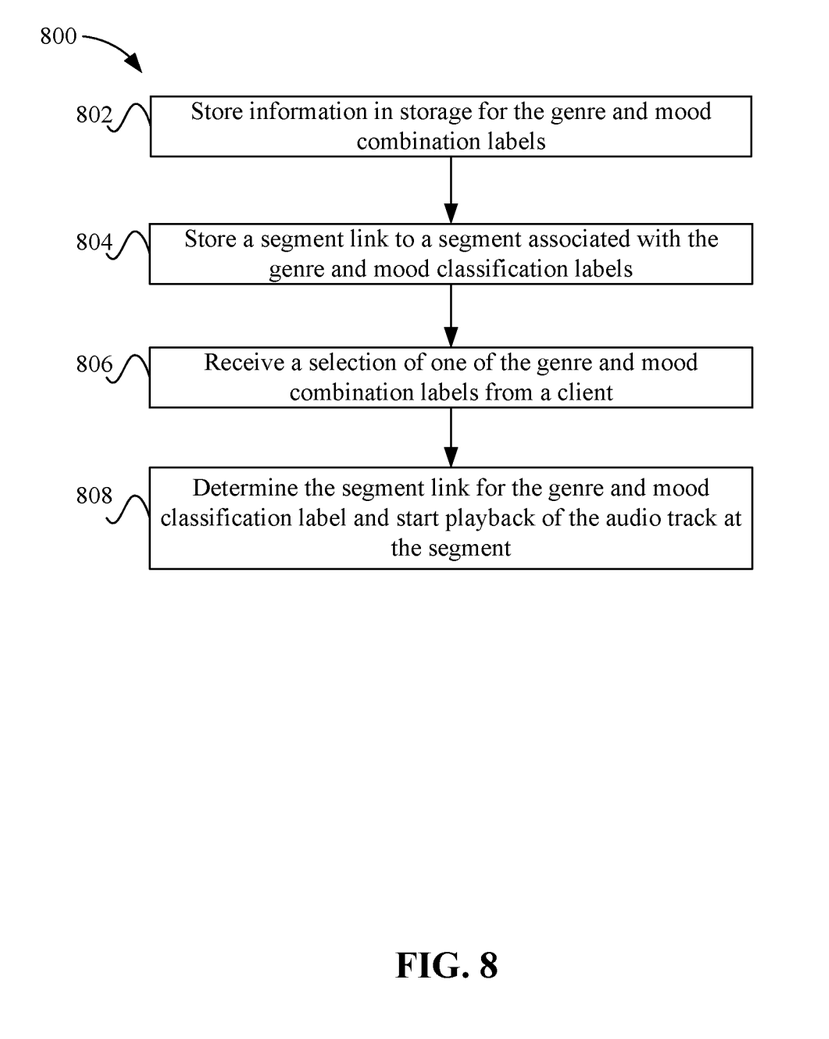
FIG. 8 depicts a simplified flowchart of a method for isolating segments of the audio track according to corresponding genre and mood combination labels according to some embodiments.

FIG. 8 depicts a simplified flowchart 800 of a method for isolating segments of the audio track 114 according to corresponding genre and mood combination labels according to some embodiments. At 802, audio service manager 110 stores information in storage 106 for the genre and mood combination labels. For example, the genre and mood classification labels with associated average output values that are computed over all of the segments may be stored. Then, at 804, audio service manager 110 may store a segment link to a segment associated with the genre and mood classification labels. For example, the top four genre and mood classification labels may have segment links associated with them.

At 806, audio service manager 110 receives a selection of one of the genre and mood combination labels from a client 104. For example, audio player 112 may receive a selection of one of the genre and mood combination labels.

At 808, audio service manager 110 determines the segment link for the genre and mood classification label and starts playback of the audio track 114 at the segment. For example, a segment with the highest probability for the genre and mood classification label may be used to start playback of the audio track. In other embodiments, each segment that is associated with the genre and mood classification label may be played back without playing back other segments that are classified with other genre and mood combination labels.

CONCLUSION

Accordingly, some embodiments provide an automatic labeling of audio tracks 114. For example, the output values for genre and mood combinations of segments can be used to automatically label the audio track. In some examples, a single label with the highest average output value over all the segments may be assigned to audio track 114. Or, multiple genre and mood combination labels may be assigned to audio track 114. The automatic labeling may be more accurate and more efficient than human-based labeling. Also, the ability to label an audio track with multiple genre and mood combinations is hard to perform manually because not only would multiple portions need to be classified instead of labeling just the entire audio track, but also manually identifying portions of the audio track for the combination is much harder than analyzing the audio segment for just one of the genre and/or mood separately.

Example Computer System

Figure 9:
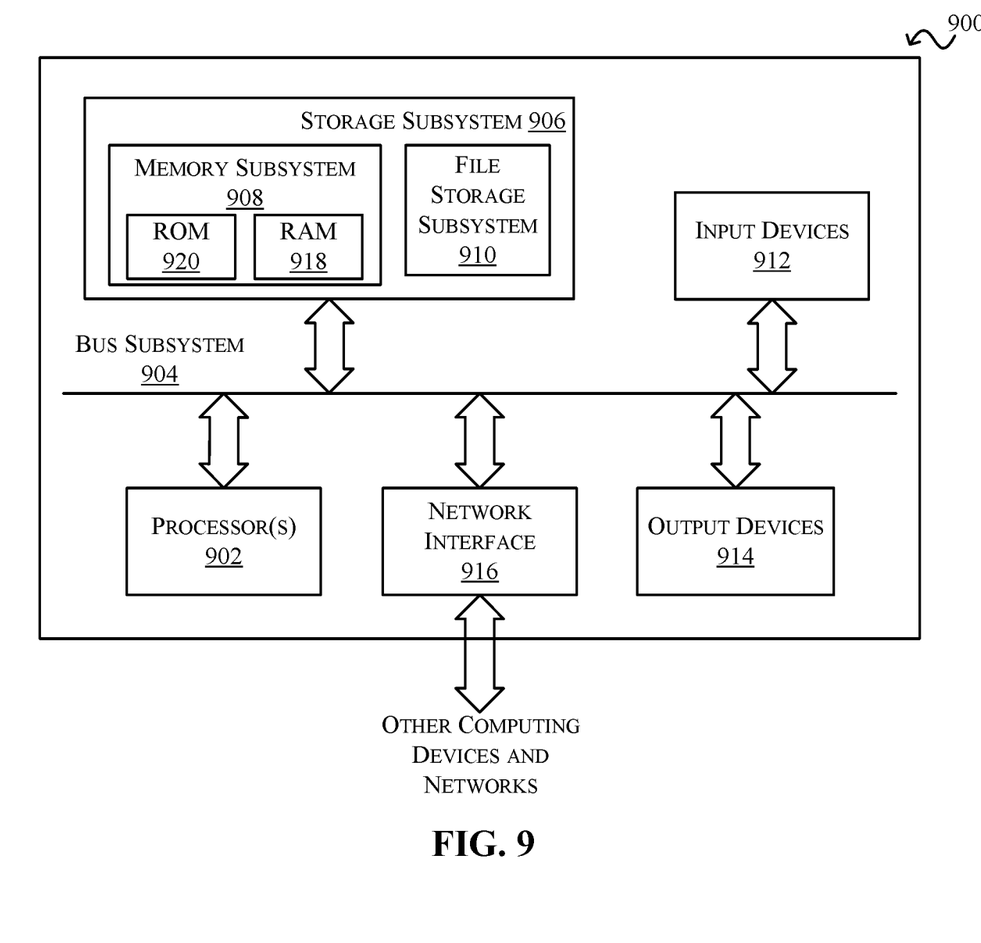
FIG. 9 depicts a simplified block diagram of an example computer system according to certain embodiments.

FIG. 9 depicts a simplified block diagram of an example computer system 900 according to certain embodiments. Computer system 900 can be used to implement any of the computing devices, systems, or servers described in the foregoing disclosure. As shown in FIG. 9, computer system 900 includes one or more processors 902 that communicate with a number of peripheral devices via a bus subsystem 904. These peripheral devices include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Storage subsystem 906 includes a memory subsystem 908 and a file/disk storage subsystem 910. Subsystems 908 and 910 represent non-transitory computer-readable storage media that can store program code and/or data that provide the functionality of embodiments of the present disclosure.

Memory subsystem 908 includes a number of memories including a main random access memory (RAM) 918 for storage of instructions and data during program execution and a read-only memory (ROM) 920 in which filed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
   a processor; and
   a computer readable storage medium having stored thereon program code that, when executed by the processor, causes the processor to:
   receive an audio signal for an audio track;
   segment the audio signal into a plurality of segments of the audio signal;
   input the plurality of segments of audio into a classification network, wherein the classification network is configured to predict, from different combinations of a plurality of genres and a plurality of moods, output values based on a plurality of genre and mood combinations;
   predict, using the classification network, a set of output values for the plurality of segments, each of the set of output values corresponding to one or more of the plurality of genre and mood combinations;

assign one or more of the plurality of genre and mood combinations to the audio track based on the set of output values for one or more of the plurality of segments; and store a link associated with a segment for each of the one or more of the plurality of genre and mood combinations, wherein the link allows playback of the audio track at the segment associated with the link to start upon a selection from the one or more of the plurality of genre and mood combinations.

2. The computer system of claim 1, wherein the classification network includes an output layer with a number of outputs based on the plurality of genre and mood combinations.

3. The computer system of claim 2, wherein the number of outputs in the output layer is equal to a number of the plurality of genre and mood combinations.

4. The computer system of claim 2, wherein each output in the output layer predicts an output value for one of plurality of genre and mood combinations.

5. The computer system of claim 1, wherein the program code further causes the processor to:

input a training set of segments into the classification network, the training set of segments associated with output values for the plurality of genre and mood combinations; and train the classification network to predict the output values for the plurality of genre and mood combinations for respective segments in the training set of segments.

6. The computer system of claim 1, wherein an output value in the set of output values predicts a probability that a segment includes characteristics of audio associated with a respective genre and mood combination.

7. The computer system of claim 1, wherein the program code further causes the processor to:

generate an average output value for each of the plurality of genre and mood combinations from respective output values corresponding to the plurality of genre and mood combinations for the plurality of segments.

8. The computer system of claim 7, wherein the program code further causes the processor to:

use the average output value for each of the plurality of genre and mood combinations to assign the one or more of the plurality of genre and mood combinations to the audio track.

9. The computer system of claim 1, wherein the link is associated with a segment with a highest output value for each of the one or more of the plurality of genre and mood combinations.

10. The computer system of claim 1, wherein the link is associated with the segments with an output value above a threshold for each of one or more of the plurality of genre and mood combinations.

11. The computer system of claim 1, wherein the program code further causes the processor to:

receive the selection of the one or more of genre and mood combinations;

retrieve the link for the one or more of the plurality of genre and mood combinations; and start playback of the audio track at the segment associated with the link.

12. The computer system of claim 1, wherein the program code further causes the processor to:

use the set of output values for the plurality of genre and mood combinations to compare the audio track to another set of output values for the plurality of genre and mood combinations of another audio track to determine a similarity between the audio track and the another audio track.

13. The computer system of claim 1, wherein the program code further causes the processor to:

determine a similarity between the audio track and another audio track, wherein the similarity is compared from values in a layer of the classification network before an output layer of the classification network.

14. The computer system of claim 1, wherein the program code further causes the processor to:

use the assigned one or more of the plurality of genre and mood combinations to determine if the audio track is previously mislabeled with another genre and mood combination.

15. The computer system of claim 1, wherein the program code further causes the processor to:

use the one or more of the plurality of genre and mood combinations to generate a playlist of audio tracks, wherein the audio tracks in the playlist are assigned the one or more genre and mood combinations.

16. The computer system of claim 1, wherein the classification network comprises:

a first layer to generate a compressed representation of the plurality of segments of audio, wherein the output layer includes a number of outputs equal to a number of the plurality of genre and mood combinations.

17. A method comprising:

receiving, by a computing device, an audio signal for an audio track;

segmenting, by the computing device, the audio signal into a plurality of segments of the audio signal;

inputting, by the computing device, the plurality of segments of audio into a classification network, wherein the classification network is configured to predict, from different combinations of a plurality of genres and a plurality of moods, output values based on a plurality of genre and mood combinations;

predicting, by the computing device using the classification network, a set of output values for the plurality of segments, each of the set of output values corresponding to one or more of the plurality of genre and mood combinations;

assigning, by the computing device, one or more of the plurality of genre and mood combinations to the audio track based on the set of output values for one or more of the plurality of segments; and storing, by the computing device, a link associated with a segment for each of the one or more of the plurality of genre and mood combinations, wherein the link allows playback of the audio track at the segment associated with the link to start upon a selection from the one or more of the plurality of genre and mood combinations.

18. The method of claim 17, wherein the output layer includes a number of outputs based on the plurality of genre and mood combinations.

19. A non-transitory computer readable storage medium having stored thereon program code executable by a computer system, the program code causing the computer system to:

receive an audio signal for an audio track;

segment the audio signal into a plurality of segments of the audio signal;

input the plurality of segments of audio into a classification network, wherein the classification network is configured to predict, from different combinations of a plurality of genres and a plurality of moods, output values based on a plurality of genre and mood combinations;

predict, using the classification network, a set of output values for the plurality of segments, each of the set of output values corresponding to one or more of the plurality of genre and mood combinations; and assign one or more of the plurality of genre and mood combinations to the audio track based on the set of output values for one or more of the plurality of segments; and store a link associated with a segment for each of the one or more of the plurality of genre and mood combinations, wherein the link allows playback of the audio track at the segment associated with the link to start upon a selection from the one or more of the plurality of genre and mood combinations.

* * * * *